United States Patent
Chang et al.

(10) Patent No.: US 12,243,988 B2
(45) Date of Patent: Mar. 4, 2025

(54) BATTERY PRESSURE ACTIVE CONTROL

(71) Applicant: GM Global Technology Operations LLC, Detroit, MI (US)

(72) Inventors: Insu Chang, Troy, MI (US); Chen-fang Chang, Bloomfield Hills, MI (US); Jun-mo Kang, Ann Arbor, MI (US); Hanho Yun, Oakland Township, MI (US); Chunhao J. Lee, Troy, MI (US); Yongjie Zhu, Troy, MI (US); Nicholas W. Pinto, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 47 days.

(21) Appl. No.: 18/350,488

(22) Filed: Jul. 11, 2023

(65) Prior Publication Data

US 2025/0023120 A1  Jan. 16, 2025

(51) Int. Cl.
*H01M 10/42* (2006.01)
*B60L 50/64* (2019.01)
(Continued)

(52) U.S. Cl.
CPC ......... *H01M 10/4257* (2013.01); *B60L 50/64* (2019.02); *H01M 10/052* (2013.01);
(Continued)

(58) Field of Classification Search
CPC ........... H01M 10/4257; H01M 50/249; H01M 50/204; H01M 10/052; H01M 10/482;
(Continued)

(56) References Cited

U.S. PATENT DOCUMENTS

| | | | |
|---|---|---|---|
| 9,012,049 B2 | 4/2015 | Fetzer et al. | |
| 2020/0168959 A1* | 5/2020 | Hettrich | H01M 10/615 |

(Continued)

FOREIGN PATENT DOCUMENTS

| | | |
|---|---|---|
| DE | 102009028986 A1 | 3/2011 |
| DE | 102018103305 A1 | 8/2019 |

OTHER PUBLICATIONS

German Application No. 10 2023 127 378.7 filed Oct. 8, 2023; German Office Action dated Apr. 30, 2024; 5 pages.

*Primary Examiner* — Carlos Amaya
(74) *Attorney, Agent, or Firm* — CANTOR COLBURN LLP

(57) ABSTRACT

A vehicle includes a propulsion system having multiple electric motors. A battery system is connected to the electric motors via a direct current to direct current (DC-DC) converter and an inverter. The battery system includes a battery assembly having a plurality of battery modules. Each of the battery modules has multiple individual battery cells arranged in battery packs, a set of sensors configured to monitor a set of parameters of each battery pack, and a plurality of battery pack mounts. Each battery pack mount includes a base plate and a top plate and an actuator configured to alter a distance between plates. A monitoring unit is configured to monitor a value representative of a battery pack pressure, determine whether the value falls within a pressure threshold window, and maintain the value within the pressure threshold window by actively altering the battery pack pressure.

20 Claims, 5 Drawing Sheets

(51) Int. Cl.
*H01M 10/052* (2010.01)
*H01M 10/48* (2006.01)
*H01M 50/204* (2021.01)
*H01M 50/249* (2021.01)

(52) U.S. Cl.
CPC ....... *H01M 10/482* (2013.01); *H01M 50/204* (2021.01); *H01M 50/249* (2021.01); *B60L 2210/10* (2013.01); *B60L 2210/40* (2013.01); *H01M 2010/4271* (2013.01); *H01M 2220/20* (2013.01)

(58) Field of Classification Search
CPC ...... H01M 2010/4271; H01M 2220/20; B60L 50/64; B60L 2210/10; B60L 2210/40
See application file for complete search history.

(56) References Cited

U.S. PATENT DOCUMENTS

| | | | |
|---|---|---|---|
| 2022/0080852 A1* | 3/2022 | Yu | H02J 7/00034 |
| 2023/0118071 A1 | 4/2023 | Laramie et al. | |
| 2023/0124344 A1* | 4/2023 | Perera | H01M 50/204 |
| | | | 429/7 |

* cited by examiner

BATTERY PRESSURE ACTIVE CONTROL

INTRODUCTION

The subject disclosure relates to a method and system for actively managing a pressure of a lithium metal battery pack or similar battery pack.

Vehicles, including gasoline and diesel power vehicles, as well as electric and hybrid electric vehicles, feature battery power storage for purposes such as powering electric motors, electronics and other vehicle subsystems. Vehicle battery systems may be charged using power sources such as charging stations, other electric vehicle battery systems and/or an electrical grid. Typically, during charging processes, a height of the battery pack is maintained at a constant state via a fixed gap restraint in order to prevent inadvertent expansion of the battery pack. However, as the battery pack ages, and as the battery pack is charged and discharged, a pressure within the battery pack increases and the constant maintained height exacerbates the pressure increase. The pressure increase can negatively impact the performance of the battery pack.

Accordingly, it is desirable to provide a battery monitoring system that accounts for a buildup of pressure within the battery pack.

SUMMARY

In one exemplary embodiment a method for operating a battery system includes monitoring a value representative of a battery pack pressure, determining whether the value falls within a pressure threshold window, and maintaining the value within the pressure threshold window by actively altering the battery pack pressure in response to the value falling outside the pressure window.

In addition to one or more of the features described herein the value representative of the battery pack pressure is a length between a first pressure plate and a second pressure plate and where the battery pack is disposed between the first pressure plate and the second pressure plate.

In addition to one or more of the features described herein the value representative of the battery pack pressure is a measured pressure of the battery pack.

In addition to one or more of the features described herein at least one of an upper bound of the pressure threshold window and a lower bound of the pressure threshold window is dependent on a volume of the battery pack.

In addition to one or more of the features described herein determining whether the value falls within a pressure threshold window comprises calculating a pressure based on a target length and a feedback length.

In addition to one or more of the features described herein the battery pack is a lithium metal battery.

In addition to one or more of the features described herein the pressure threshold window is centered on a target pressure value such that an upper bound of the pressure threshold window and a lower bound of the pressure threshold window are equidistant from the target pressure value.

In addition to one or more of the features described herein the upper bound and the lower bound are dependent on at least one of an age of the battery pack, a state of charge of the battery pack, and a number of charge/discharge cycles the battery pack has undergone.

In another exemplary embodiment a battery assembly includes a plurality of battery modules, each of the battery modules including a plurality of individual battery cells arranged in battery packs, a set of sensors configured to monitor a set of parameters of each battery pack, a plurality of battery pack mounts, each battery pack mount including a base plate and a top plate disposed about a battery pack, each battery pack mount further including an actuator configured to alter a distance between the top plate and the base plate, a monitoring unit including a processor and a memory, the monitoring unit being configured to receive measurements from sensors, the memory storing instructions for causing the processor to monitor a value representative of a battery pack pressure, determine whether the value falls within a pressure threshold window, and maintain the value within the pressure threshold window by actively altering the battery pack pressure in response to the value falling outside the pressure window.

In addition to one or more of the features described herein the value representative of the battery pack pressure is a measured pressure of the battery pack.

In addition to one or more of the features described herein the value representative of the battery pack pressure is a measured pressure of the battery pack.

In addition to one or more of the features described herein the value representative of the battery pack pressure is a measured pressure of the battery pack.

In addition to one or more of the features described herein determining whether the value falls within a pressure threshold window comprises calculating a pressure based on a target length and a feedback length.

In addition to one or more of the features described herein the upper bound and the lower bound are dependent on at least one of an age of the battery pack, a state of charge of the battery pack, and a number of charge/discharge cycles the battery pack has undergone.

In yet another exemplary embodiment a vehicle includes a propulsion system having a first electric motor and a second electric motor, a battery system connected to the first electric motor and the second electric motor via a direct current to direct current (DC-DC) converter and an inverter, the battery system comprising a battery assembly having a plurality of battery modules, each of the battery modules including a plurality of individual battery cells arranged in battery packs, a set of sensors configured to monitor a set of parameters of each battery pack, a plurality of battery pack mounts, each battery pack mount including a base plate and a top plate disposed about a battery pack, each battery pack mount further including an actuator configured to alter a distance between the top plate and the base plate, and a monitoring unit including a processor and a memory, the monitoring unit being configured to receive measurements from sensors, the memory storing instructions for causing the processor to monitor a value representative of a battery pack pressure, determine whether the value falls within a pressure threshold window, and maintain the value within the pressure threshold window by actively altering the battery pack pressure in response to the value falling outside the pressure window.

In addition to one or more of the features described herein the value representative of the battery pack pressure is a measured pressure of the battery pack.

In addition to one or more of the features described herein the value representative of the battery pack pressure is a measured pressure of the battery pack.

In addition to one or more of the features described herein determining whether the value falls within a pressure threshold window comprises calculating a pressure based on a target length and a feedback length.

In addition to one or more of the features described herein the upper bound and the lower bound are dependent on at least one of an age of the battery pack, a state of charge of the battery pack, and a number of charge/discharge cycles the battery pack has undergone.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
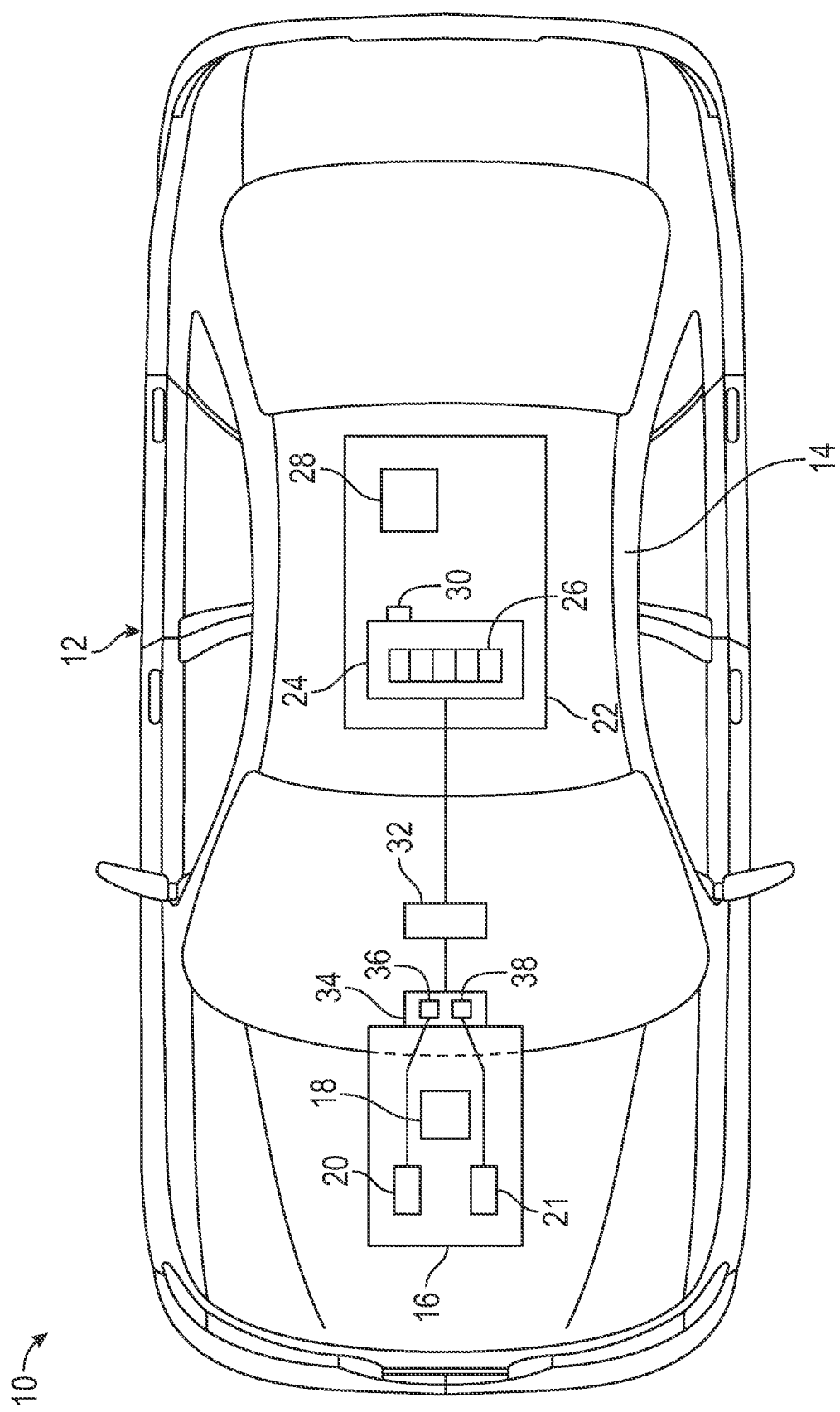
FIG. 1 is a schematic illustration of a vehicle.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment a battery monitoring system actively monitors parameters of a battery pack, with the parameter being representative of a pressure of the battery pack. When the pressure falls below a lower bound, or moves above an upper bound of a pressure threshold window, the battery monitoring system actively adjusts the pressure, thereby maintaining the pressure of the battery pack within the pressure window, and increasing the lifespan of the battery pack. In this example, the upper and lower bounds are dependent on the volume of the battery pack, and the pressure increase will also result in a volume increase in the battery pack.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, a fuel injection subsystem, an exhaust subsystem and others.

The vehicle 10 may be a combustion engine vehicle, an electrically powered vehicle (EV) or a hybrid vehicle. In an embodiment, the vehicle 10 is a hybrid vehicle that includes a combustion engine system 18 and at least one electric motor system. For example, the propulsion system 16 includes a first electric motor 20 and a second electric motor 21. The motors 20 and 21 may be configured to drive wheels on opposing sides of the vehicle 10. Any number of motors positioned at various locations may be used.

The vehicle 10 includes a battery system 22, which may be electrically connected to the motors 20 and 21 and/or other components, such as vehicle electronics. The battery system 22 may be configured as a rechargeable energy storage system (RESS).

In an embodiment, the battery system 22 includes a battery assembly such as a high voltage battery pack 24 having a plurality of battery modules 26. Each of the battery modules 26 includes a number of individual cells arranged in battery packs. The battery system 22 may also include a monitoring unit 28 (e.g., RESS controller) configured to receive measurements from sensors 30. Each sensor 30 may be an assembly or system having one or more sensors for measuring various battery and environmental parameters, such as temperature, battery pack gap distance, battery pack pressure, current, voltage and state of charge. The monitoring unit 28 includes components such as a processor, memory, an interface, a bus and/or other suitable components.

The battery system 22 is electrically connected to a direct current (DC)-DC converter module 32 and an inverter module 34. The inverter module 34 (e.g., a traction power inversion unit or TPIM) converts direct current (DC) power from the battery assembly to three-phase alternating current (AC) power to drive the motors. In an embodiment, the inverter module 34 includes a first inverter 36 connected to the motor 20, and a second inverter 38 connected to the motor 21.

In some embodiments the battery modules 26 are constructed of lithium metal battery cells, or similar styles of battery cells. During operation of the vehicle, as the battery cells charge and discharge (referred to as charging/discharging cycles) the pressure on each battery cell changes. During each charge/discharge cycle a majority of the pressure increase is reversible, however a portion is irreversible. Irreversible pressure increase is undesirable and should be minimized in order to increase the life cycle of the battery pack.

Figure 2:
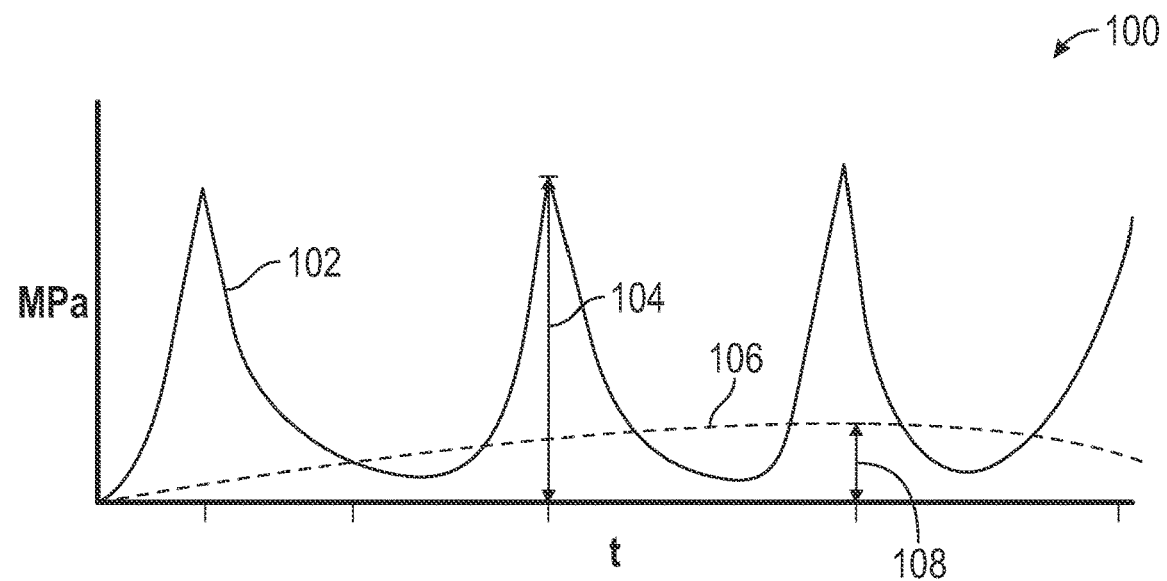
FIG. 2 is a chart of battery pack pressure over a charge/discharge cycle.

FIG. 2 is a chart 100 demonstrating a battery pack pressure MPa (vertical axis) over time t (horizontal axis) through multiple charge/discharge cycles. Typical existing battery cell structures position one or more cells between two plates, with the plates being positioned a fixed distance apart. In such a configuration, the pressure swings across charge/discharge cycles are illustrated via the solid line 102. Some attempts to minimize the pressure swings have included using spring loaded plates, where the springs compress as the pressure increases, allowing for the gap between the plates to shift across the charge/discharge cycle. A dashed line 106 illustrates the pressure change across charge/discharge cycles of the spring loaded variable distance structure. Incorporating spring loading and allowing the gap to shift according to the changing pressure of the battery pack is referred to as using a passive gap adjustment and decreases the peak pressure 108. In some examples the decrease in peak pressures can be approximately an order of magnitude.

Figure 3:
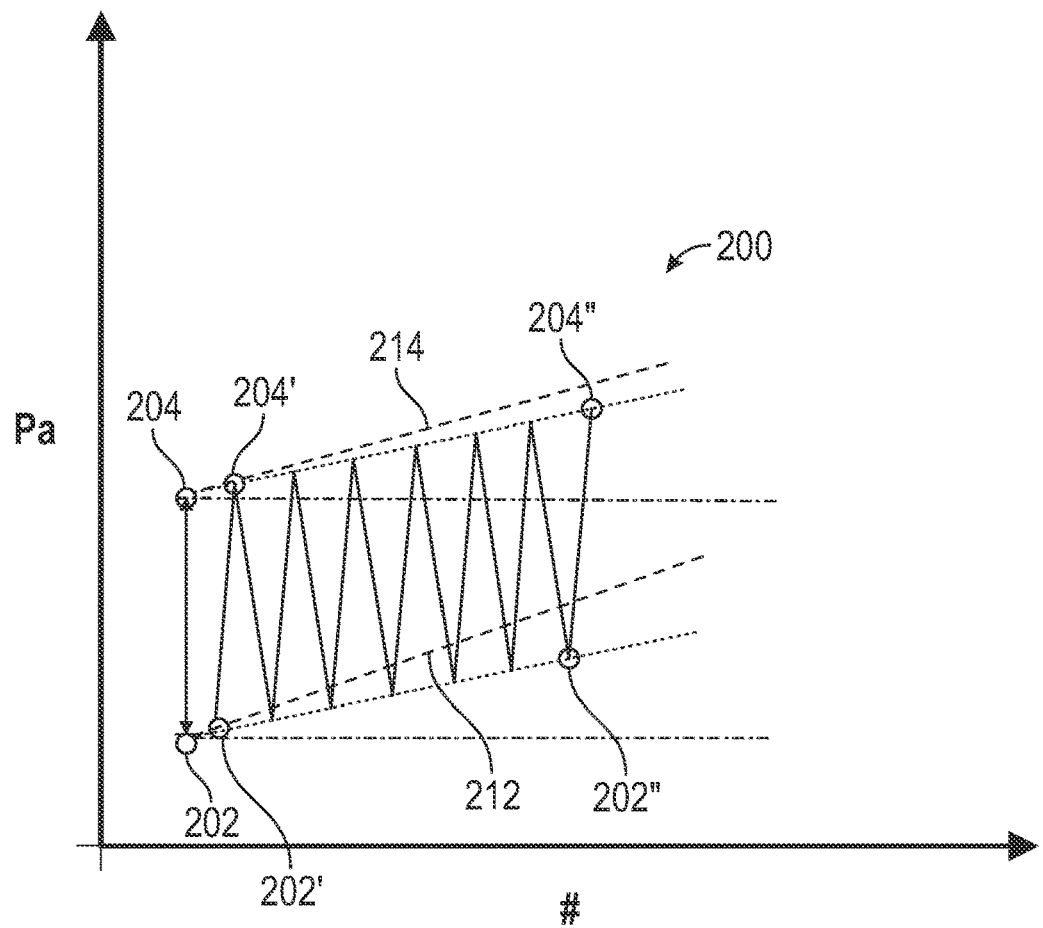
FIG. 3 is a chart illustrating a reversible pressure window.

With continued reference to FIG. 2, FIG. 3, illustrates a chart 200 showing the expansion of a given battery cell across multiple cycles, with the vertical axis representing a cell pressure, and the horizontal axis representing a number of charge/discharge cycles. A fresh battery pack (e.g., at charge/discharge cycle number zero), starts with a pressure at a minimum pressure value 202. As the pressure increases during a charge/discharge cycle, the pressure approaches a maximum reversible pressure value 204. The distance between the minimum pressure 202 and the maximum reversible pressure 204 is referred to as the reversible pressure window. Any pressure increase beyond the maximum reversible value is irreversible, and shifts the minimum and maximum pressure 202, 204 up by the irreversible amount to new positions 202', 204'. Across multiple cycles the reversible pressure window gets shifted upward, as can be seen at 202" and 204". Systems incorporating a passive gap adjustment (e.g., spring loaded battery pack plates) have a lower, but still steady increase in the reversible pressure window and are illustrated via the solid lines. In contrast, a fixed gap distance increases at a faster rate, resulting in a shorter life cycle of the battery pack, with the window increase being illustrated via a pair of dashed lines 212, 214.

Figure 4:
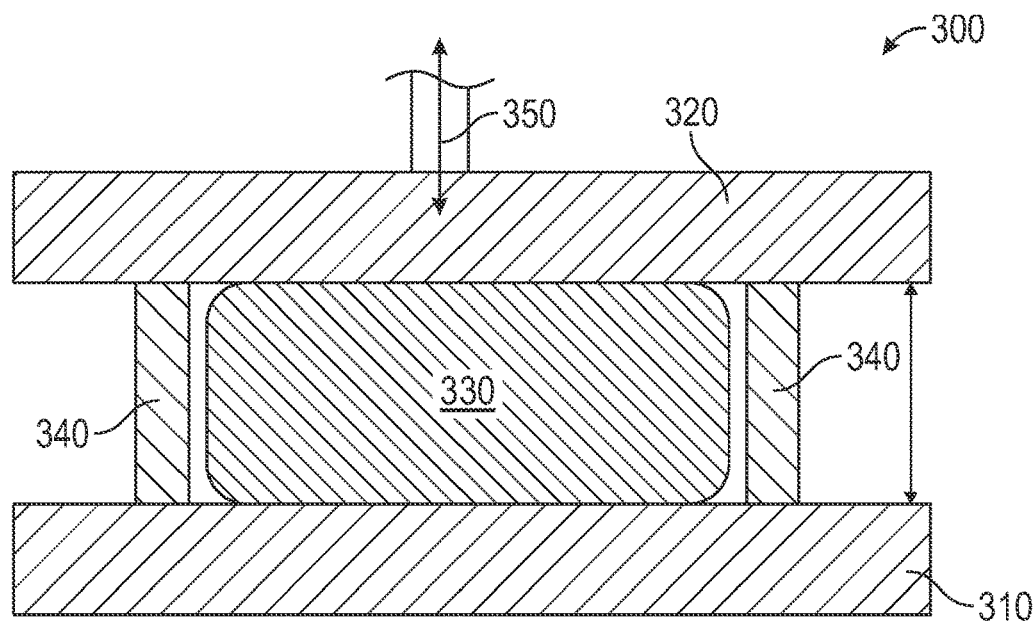
FIG. 4 is a highly schematic simplified battery pack mount.

In order to minimize the irreversible pressure changes described above, the battery system 22 of the vehicle 10 illustrated in FIG. 1 includes a pressure management system that actively controls a pressure on the battery pack, thereby ensuring that the pressure stays within the reversible pressure window described with regards to FIG. 3. The active management system includes a control module within the monitoring unit 28. The control module actively controls a gap distance between plates securing a battery pack in place and the active control of the gap controls the pressure of the battery pack 330 (see FIG. 4).

With continued reference to FIGS. 1-3, FIG. 4 illustrates a simplified example battery pack mount 300. The simplified battery pack mount 300 includes a base plate 310 and a top plate 320. A battery pack 330 is situated between the base plate 310 and the top plate 320. A set of supports 340 separate the plates 310, 320 and maintain a desired distance l between the plates 310, 320. An actuation system 350 is configured to move the top plate 320 and the bottom plate 310 closer and farther apart. The actuation system can be any suitable actuator. In alternate examples, other types of similarly controlled and functioning actuators can be used within the system as well. The movement of the plates 310, 320 increases, or decreases, the length l and the pressure/expansion that the battery pack 330 experiences. For a given length l between the top plate 320 and the bottom plate 310, the pressure is a nonlinear function of the state of charge (SOC), with a higher state of charge resulting in a higher pressure, and a lower state of charge resulting in a lower pressure. Application of actively controlled external pressure via the actuation system can decrease permanent expansion by determining the pressure, reduce the growth of dendrites within the battery, and can increase the life cycle of the battery.

With continued reference to FIGS. 1-4, FIG. 5 illustrates a control process 400 for controlling the pressure via a target length l of the gap. Initially, monitoring unit 28 identifies a target pressure in a "Read Target Pressure" step 410. The target pressure can be stored in a memory, determined via a controller, or received from another control system and is either a constant value irrespective of state of charge and aging of the battery, or a variable value that is dependent upon the current state of charge and position in a charge/discharge operation.

Subsequently, the pressure of the battery pack 330 is estimated or directly measured in a "Measure or Estimate the Current Pressure" step 420. The pressure is, in one example, measured directly using a pressure sensor within the set of sensors 30. In another example, the pressure is estimated based on known or measurable factors including the length l. Once both the target pressure and the estimated pressure are identified, the control process determines if a difference between the target and the reference is greater than acceptable difference, in a difference check 430. The acceptable difference is one half the reversible pressure window, and the difference check 430 determines that the reference is outside of the reversible pressure window when the difference exceeds the acceptable difference. If the target and the reference are within the acceptable difference, the process 400 returns to the start, and no pressure adjustment is made.

If the difference exceeds the acceptable difference, the monitoring unit 28 identifies that the pressure is outside of the acceptable pressure window and determines if the current pressure is greater than the target pressure in a comparison step 440. When the current pressure is greater than the target pressure, the process 400 decreases the volume of the battery chamber by reducing the length l in decrease volume step 450. Alternatively, when the target pressure is not less than the current pressure, the monitoring system 28 increases the volume of the battery chamber in an increase volume step 460.

Figure 5:
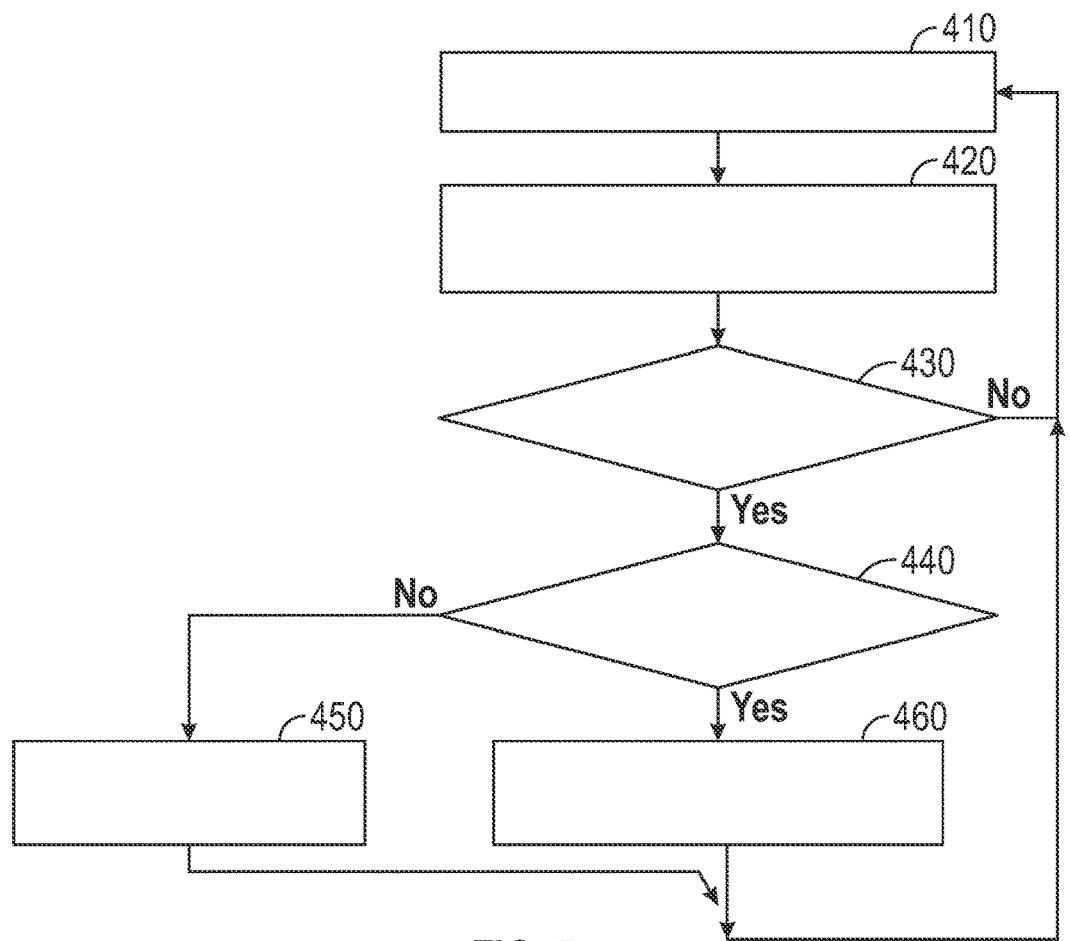
FIG. 5 is an example process for actively controlling a battery pack pressure.

The control process illustrated in FIG. 5 is an actuation-based system that controls the pressure by adjusting the gap (l) between the plates in order to attenuate long-term and/or short-term pressure variations throughout a charge/discharge operation.

In a more specific example, the pressure control is achieved by controlling the gap to a target length l instead of a target pressure. With continued reference to FIGS. 1-5, FIG. 6 illustrates a flowchart 500 of an example process where battery pressure control is achieved by controlling the gap l to a targeted gap length. When a measured gap length l is available, such as via the sensors 30, a simple feedback controller (e.g., a proportional-integral-derivative, PID, controller) can be utilized to control the gap to the target gap length. In alternate cases, where the gap length l is not directly measurable, or a direct measurement is not available, the target pressure can be calculated based on the target length and a feedback control on the desired pressure. The current battery pack pressure can be either measured or estimated.

Referring to the chart 500, an initial state of charge of the battery pack 330, a voltage of the battery pack 330, and temperature of the battery pack 330 are determined via the sensors 30 and/or derived from available sensor data in a "Read SOC, V, Temperature" step 510. Once the parameters are determined, the pressure increase in the battery pack 330 due to irreversible expansion is calculated in a "Calculate the Pressure Increase Due to Irreversible Expansion" step 520. Based on the calculated pressure increase, the target length l of the gap is calculated in an "Update Target Length" step 530.

Once the target length is determined, the target pressure is updated based on the new target length in an "Update Optimal Pressure" step 540 and the current pressure is determined either via direct measurement from the sensors 330 or derived from sensor measurements in a "Read Current Pressure Step" 550. A difference between the current pressure and the target pressure is checked at a difference check 560. When the difference does not exceed a window size, the process restarts (510). When the difference does exceed the window size, it is determined that the pressure on the battery pack 330 needs to be adjusted, and the controller determines if the current pressure is larger than the target pressure in a comparison step 570. When the current pressure is larger than the target pressure, the length l is increased, thereby decreasing the pressure, in an "Increase 1" step 580. In contrast, when the current pressure is not larger than the target pressure, the length 1 is decreased, thereby decreasing the pressure, in a decrease 1 step 590.

Figure 6:
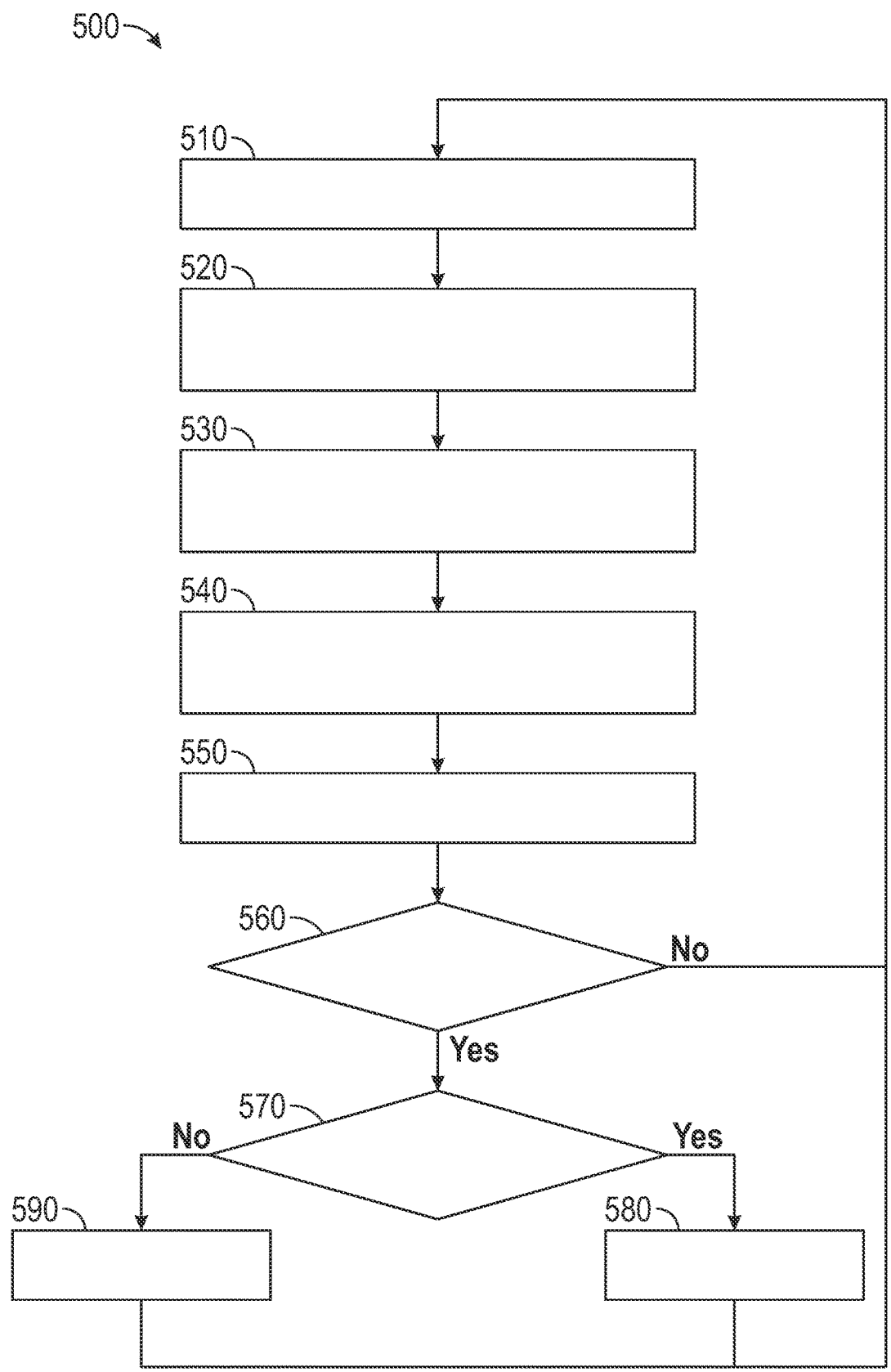
FIG. 6 is a more detailed example process for actively controlling a battery pack pressure.
Figure 7:
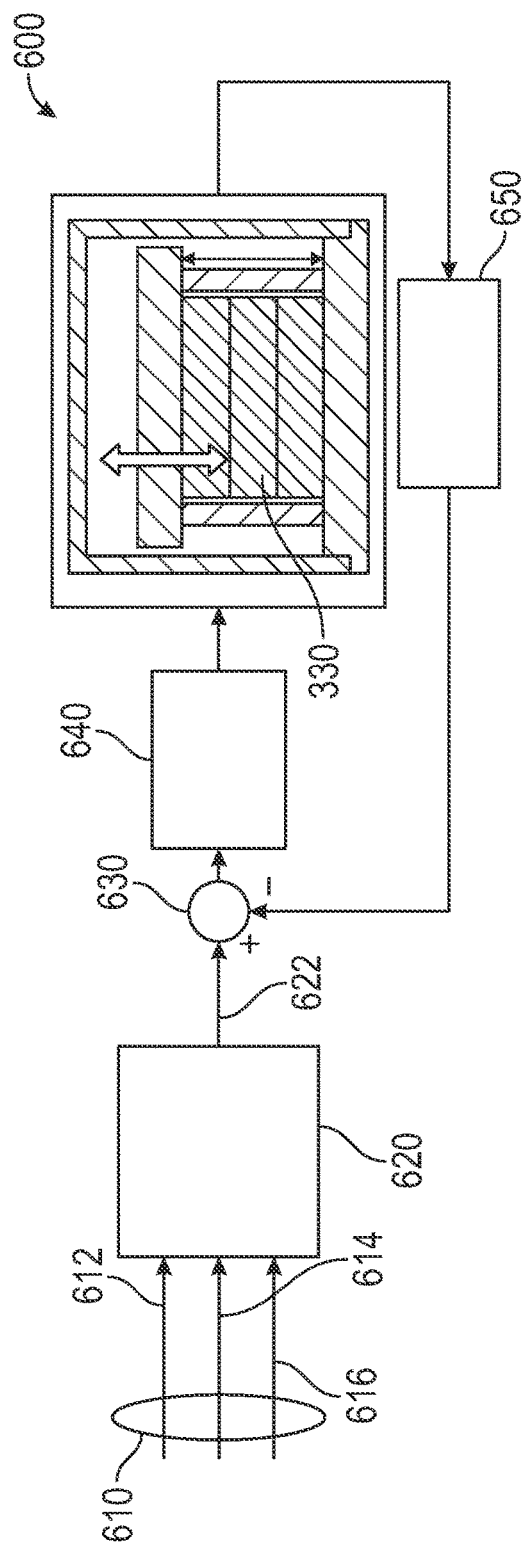
FIG. 7 is a control system for implementing the processes of FIGS. 5 and 6.
Figure 8:
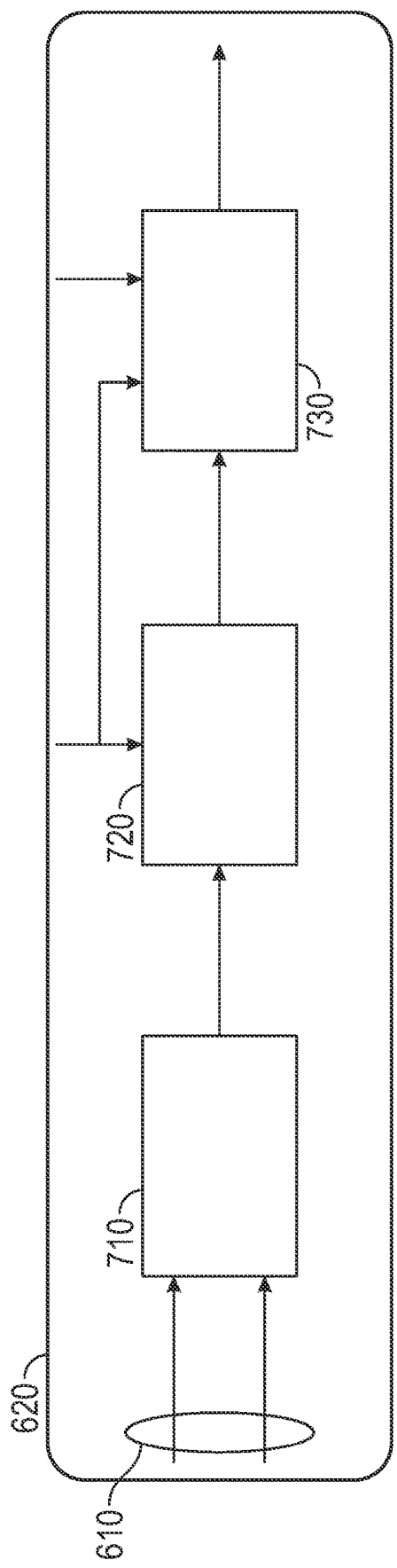
FIG. 8 is one example control back configured to be used in the control system of FIG. 7.

With continued reference to FIGS. 1-6, and with specific reference to FIGS. 5 and 6, FIG. 7 illustrates a control diagram 600 for implementing either of the control schemes described by FIGS. 5 and 6. The control diagram 600 includes inputs for a set of state variables 610, including a battery pack voltage 612, a state of charge 614 of the battery pack 330, and a temperature 616 of the battery pack 330. The state variables 610 are provided to a control block 620. In some examples, additional state variables 610 that are measured or derived can be provided to the control block 620. The control block 620 identifies the desired pressure of the battery pack 330 as per steps 510-530 of FIG. 6, and outputs the desired pressure 622.

The desired pressure is combined with a measured or derived current pressure at a combiner 630. The output of the combiner 630 is provided to an actuator controller 640, and the actuator controller 640 adjusts the positioning of the plates to either control for the length 1, or control for a battery pack pressure as in FIGS. 5 and 6. As the actuator adjusts the plates, and thus the pressure on the battery pack 330, the current pressure 650 is recirculated to the combiner 630 in a feedback loop.

With continued reference to FIGS. 1-7, FIG. 8 illustrates one example implementation of the control block 620. The control block receives the charge voltage and the discharge voltages from the state variables 610 and determines a change in current pressure Δcp in a change in pressure block 710. The change in pressure and the measured state of charge (SOC) are provided to a target gap length determiner 720, which outputs the target gap length $l_{ref}$ to a target pressure determiner 730, which uses the target gap length $l_{ref}$, the state of charge SOC and the temperature (t) to determine the target pressure. The target pressure is then provided forward through the system of FIG. 7.

Using the system and method described at FIGS. 1-8, an active pressure control of the battery charge and discharge operation is implemented. The active pressure control controls the pressure of the battery pack while the battery is being operated in order to accommodate pressure buildup in the battery as the battery ages, as well as to accommodate short term pressure changes due to charging/discharging operations. The active control of the pressure reduces the generation of dendrite formations, or similar degradation in other battery types, and increases the working lifespan of the battery packs.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for operating a battery system comprising:
   monitoring a value representative of a pressure of a battery pack;
   determining whether the value falls within a pressure threshold window, the pressure threshold window being centered on an optimal pressure, wherein the optimal pressure is at least partially dependent on a target length between the first pressure plate and the second pressure plate; and
   maintaining the value within the pressure threshold window by actively altering the pressure of a battery pack in response to the value falling outside the pressure threshold window, wherein maintaining the value within the pressure threshold window comprises controlling the length between the first pressure plate and the second pressure plate to the target length.

2. The method of claim 1, wherein at least one of an upper bound of the pressure threshold window and a lower bound of the pressure threshold window is dependent on a volume of the battery pack.

3. The method of claim 1, wherein determining whether the value falls within a pressure threshold window comprises calculating a pressure based on the target length and the feedback length.

4. The method of claim 1, wherein the battery pack is a lithium metal battery.

5. The method of claim 1, wherein the pressure threshold window is centered on a target pressure value such that an upper bound of the pressure threshold window and a lower bound of the pressure threshold window are equidistant from the target pressure value.

6. The method of claim 5, wherein the upper bound and the lower bound are dependent on at least one of an age of the battery pack, a state of charge of the battery pack, and a number of charge/discharge cycles the battery pack has undergone.

7. A battery assembly comprising:
   a plurality of battery modules, each of the battery modules including a plurality of individual battery cells arranged in battery packs;
   a set of sensors configured to monitor a set of parameters of each battery pack;
   a plurality of battery pack mounts, each battery pack mount including a base plate and a top plate disposed about a battery pack, each battery pack mount further including an actuator configured to alter a distance between the top plate and the base plate;

a monitoring unit including a processor and a memory, the monitoring unit being configured to receive measurements from sensors, the memory storing instructions for causing the processor to monitor a value representative of a pressure of a battery pack, determine whether the value falls within a pressure threshold window, the pressure threshold window being centered on an optimal pressure, wherein the optimal pressure is at least partially dependent on a target length between the first pressure plate and the second pressure plate, and maintain the value within the pressure threshold window by actively altering the pressure of a battery pack in response to the value falling outside the pressure threshold window, wherein maintaining the value within the pressure threshold window comprises controlling the length between the first pressure plate and the second pressure plate to the target length.

8. The battery assembly of claim 7, wherein the value representative of the pressure of a battery pack is a measured pressure of the battery pack.

9. The battery assembly of claim 7, wherein the pressure threshold window is centered on a target pressure value such that an upper bound of the pressure threshold window and a lower bound of the pressure threshold window are equidistant from the target pressure value.

10. The battery assembly of claim 8, wherein determining whether the value falls within a pressure threshold window comprises calculating a pressure based on a target length and a feedback length.

11. The battery assembly of claim 8, wherein an upper bound and a lower bound are dependent on at least one of an age of the battery pack, a state of charge of the battery pack, and a number of charge/discharge cycles the battery pack has undergone.

12. A vehicle comprising:
a propulsion system having a first electric motor and a second electric motor;
a battery system connected to the first electric motor and the second electric motor via a direct current to direct current (DC-DC) converter and an inverter;
the battery system comprising a battery assembly having a plurality of battery modules, each of the battery modules including a plurality of individual battery cells arranged in battery packs, a set of sensors configured to monitor a set of parameters of each battery pack, a plurality of battery pack mounts, each battery pack mount including a base plate and a top plate disposed about a battery pack, each battery pack mount further including an actuator configured to alter a distance between the top plate and the base plate, and a monitoring unit including a processor and a memory, the monitoring unit being configured to receive measurements from sensors, the memory storing instructions for causing the processor to monitor a value representative of a pressure of a battery pack, determine whether the value falls within a pressure threshold window, the pressure threshold window being centered on an optimal pressure, wherein the optimal pressure is at least partially dependent on a target length between the first pressure plate and the second pressure plate, and maintain the value within the pressure threshold window by actively altering the pressure of a battery pack in response to the value falling outside the pressure threshold window, wherein maintaining the value within the pressure threshold window comprises controlling the length between the first pressure plate and the second pressure plate to the target length.

13. The vehicle of claim 12, wherein the value representative of the pressure of a battery pack is a measured pressure of the battery pack.

14. The vehicle of claim 12, wherein the pressure threshold window is centered on a target pressure value such that an upper bound of the pressure threshold window and a lower bound of the pressure threshold window are equidistant from the target pressure value.

15. The vehicle of claim 12, wherein determining whether the value falls within a pressure threshold window comprises calculating a pressure based on a target length and a feedback length.

16. The vehicle of claim 14, wherein an upper bound and a lower bound are dependent on at least one of an age of the battery pack, a state of charge of the battery pack, and a number of charge/discharge cycles the battery pack has undergone.

17. The method of claim 1, wherein determining whether the value falls within a pressure threshold window further comprises calculating a pressure increase due to irreversible expansion, updating the target length based at least in part on the irreversible expansion, and updating the optimal pressure based at least in part on the updated target length.

18. The method of claim 17, wherein determining whether the value falls within a pressure threshold window further comprises centering the pressure threshold window on the updated optimal pressure.

19. The method of claim 17, wherein updating the target length based at least in part on the irreversible expansion comprises updating the target length based on a combination of the irreversible expansion and a current state of charge of the battery pack.

20. The method of claim 17, wherein updated the optimal pressure based at least in part on the updated target length comprises updating the optimal pressure based on the updated target length, a current state of charge of the battery pack and a current temperature of the battery pack.

* * * * *